United States Patent
Goel et al.

(10) Patent No.: US 10,916,909 B2
(45) Date of Patent: Feb. 9, 2021

(54) ULTRA-WIDEBAND RAMAN AMPLIFIER WITH COMB SOURCE

(71) Applicant: Facebook, Inc., Menlo Park, CA (US)

(72) Inventors: Nitin Kumar Goel, Mountain View, CA (US); Satyajeet Singh Ahuja, Cupertino, CA (US); Gayathrinath Nagarajan, Saratoga, CA (US); Stephen Gregory Grubb, Atherton, CA (US)

(73) Assignee: Facebook, Inc., Menlo Park, CA (US)

( * ) Notice: Subject to any disclaimer, the term of this patent is extended or adjusted under 35 U.S.C. 154(b) by 344 days.

(21) Appl. No.: 15/647,191

(22) Filed: Jul. 11, 2017

(65) Prior Publication Data

US 2019/0020171 A1 Jan. 17, 2019

(51) Int. Cl.
*H01S 3/094* (2006.01)
*H01S 3/30* (2006.01)
*H04B 10/291* (2013.01)

(52) U.S. Cl.
CPC .. *H01S 3/094096* (2013.01); *H01S 3/094053* (2013.01); *H01S 3/302* (2013.01); *H04B 10/2916* (2013.01)

(58) Field of Classification Search
CPC ......... H01S 3/094096; H01S 3/094053; H01S 3/302
See application file for complete search history.

(56) References Cited

U.S. PATENT DOCUMENTS

| | | | | |
|---|---|---|---|---|
| 6,192,058 B1* | 2/2001 | Abeles | ............... | G02B 6/4248 359/337.11 |
| 6,906,854 B1* | 6/2005 | Nagel | ............... | H01S 3/06754 359/337.11 |
| 6,907,051 B1* | 6/2005 | Farmer | ............... | H01S 3/06754 372/29.01 |
| 6,937,389 B1* | 8/2005 | Ramanujam | ........ | H01S 3/06754 359/334 |
| 2002/0167719 A1* | 11/2002 | Pedersen | ............... | H01S 3/302 359/341.3 |

(Continued)

OTHER PUBLICATIONS

U.S. Appl. No. 15/375,021 by Goel, N., et al., filed Dec. 9, 2016.
(Continued)

*Primary Examiner* — Eric L Bolda
(74) *Attorney, Agent, or Firm* — Van Pelt, Yi & James LLP

(57) ABSTRACT

Disclosed are fiber amplifiers with multiple pumping sources including multiple optical sources or an optical comb source with multiple spectral lines. A comb source may include generating a plurality of evenly spaced or nearly evenly spaced spectral lines. The optical comb source may pump a fiber by propagating optical energy at the multiple spectral lines through the fiber. The comb source may cause gain in the fiber at in a band of wavelengths different from the spectral lines of the comb source. A weak signal injected into the fiber that propagates in the fiber will experience optical gain in the fiber producing an amplified signal at the wavelength within a band of wavelengths different from the comb source wavelengths. When the bandwidth of the multiple bands of gain is wide, the amplifier may be referred to as an ultra-wideband amplifier.

20 Claims, 7 Drawing Sheets

(56) References Cited

U.S. PATENT DOCUMENTS

| | | | | |
|---|---|---|---|---|
| 2002/0191898 A1* | 12/2002 | Evans | .................... | H01S 3/302 |
| | | | | 385/24 |
| 2003/0002138 A1* | 1/2003 | DeCusatis | ............... | H01S 3/302 |
| | | | | 359/334 |
| 2003/0002143 A1* | 1/2003 | Inoue | ................. | H01S 3/06754 |
| | | | | 359/341.3 |
| 2003/0025988 A1* | 2/2003 | Emori | ................ | H04B 10/2916 |
| | | | | 359/341.3 |
| 2003/0063373 A1* | 4/2003 | Emori | ............... | H04B 10/2916 |
| | | | | 359/341.3 |
| 2003/0117694 A1* | 6/2003 | Sobe | ....................... | H01S 3/302 |
| | | | | 359/334 |
| 2004/0190118 A1* | 9/2004 | Akasaka | ............ | H04B 10/2941 |
| | | | | 359/333 |
| 2008/0069159 A1* | 3/2008 | Adel | .................. | H01S 3/06754 |
| | | | | 372/32 |
| 2014/0161449 A1 | 6/2014 | Doerr et al. | | |

OTHER PUBLICATIONS

U.S. Appl. No. 15/607,113 by Goel, N. et al., filed May 26, 2017.
U.S. Appl. No. 15/681,292 by Goel, N. et al., filed Aug. 18, 2017.
Non-Final Office Action dated Dec. 29, 2017 for U.S. Appl. No. 15/375,021 by Goel, N., et al., filed Dec. 9, 2016.

\* cited by examiner

ULTRA-WIDEBAND RAMAN AMPLIFIER WITH COMB SOURCE

BACKGROUND

Social networking systems enable a large number of users (e.g., billions of users) to share data worldwide. To support this data sharing, social networking systems have multiple data centers that are distributed around the world. The multiple data centers enable the data to be distributed worldwide, e.g., to back up data or to store data near where the data will be consumed. Each of these data centers typically has a very large number of server computing devices. The server computing devices may be assigned various roles, e.g., compute, data storage, web site, etc.

Data centers may be built and geographically located based on various requirements and constraints. Data centers in developed countries can be large, where power and land are available. In countries where power and land are less available or there is a regulation concern, data centers may be smaller. Because larger data centers are easier to manage and provide superior scalability, they are preferred and tend to be built in a handful of locations. On the other hand, for flexibility and nimbleness, small data centers are preferred and they are built in many places wherever there are users of the social networking system. As a result, the infrastructure for a social networking systems may have various sizes of data centers that are geographically dispersed.

Content providers and, e.g., streaming video content providers, similarly build large data centers and can locate them near consumers of their content. They may also use services of content delivery networks to deliver content. These content delivery networks also have geographically dispersed data centers.

To exchange large amounts of data between data centers, the owners or operators of the data centers typically use high speed data communications links between the data centers, e.g., fiber optic communications links. High speed communications links (also referred to herein as "lines"), e.g., fiber optic links, can have two physical communications lines (e.g., fibers) that together form a circuit. One of these lines is typically used to transmit data and the other line is typically used to receive data. This is commonly known as full duplex communications. Fiber-optic links require optical amplifiers to amplify weak signals. Improvements are needed to make optical amplifiers more flexible, cost effective, and reliable.

BRIEF DESCRIPTION OF THE DRAWINGS

Where possible, like reference numerals refer to the same or similar features.

DETAILED DESCRIPTION

Figure 1:
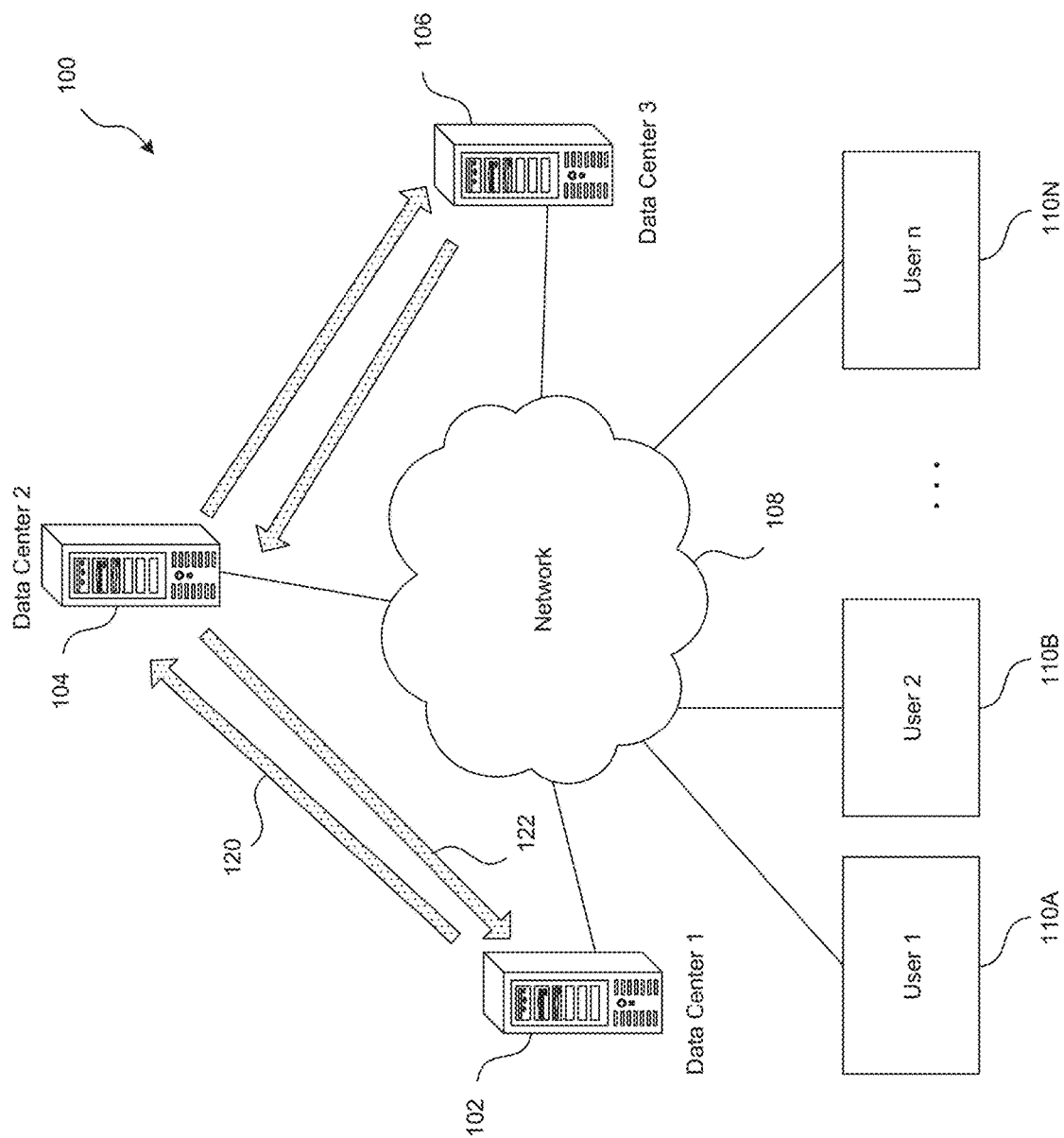
FIG. 1 is an example block diagram illustrating an environment in which an optical amplifier may be employed, in accordance with some example embodiments.

Apparatuses, methods, and systems are disclosed. In one aspect there is a an optical communication node (or "node"). The node may include a first wavelength division multiplexing coupler including a first port, a second port and a third port. A first end of an optical fiber may be coupled to the third port of the first wavelength division duplexing coupler. The node may further include an optical pumping source coupled to the first port. The first port may receive an optical pumping signal from the pumping source in a first band of wavelengths propagating in a reverse direction along the optical fiber. The second port may provide an amplified signal within a second band of wavelengths propagating in a forward direction along the optical fiber. The pumping source may include a comb source producing a plurality of comb bands within the first band of wavelengths, the plurality of comb bands being approximately equally spaced in wavelength and producing a plurality of gain bands within the second band of wavelengths upon propagation through the optical fiber. The optical pumping signal may cause an optical amplification of an input signal in the optical fiber across the second band of wavelengths to produce the amplified signal from the input signal.

The following features may be included in any combination. The apparatus may further include a second wavelength division duplexing coupler including a fourth port and a fifth port. A second end of the optical fiber may be coupled to the fourth port, and the input signal may be coupled to the fifth port. The optical fiber may have a length greater than 25 kilometers. The optical fiber may have a length less than or equal to 25 kilometers. The pumping source providing optical power to the optical fiber may form a Raman amplifier. The plurality of gain bands may overlap and produce a predetermined gain profile across the second band of wavelengths. As an example, the first band of wavelengths may lie between 1428 nm and 1466 nm. As an example, the second band of wavelengths may lie between 1535 nm and 1565 nm. Each of the plurality of comb bands may be about 90 to 100 nm apart from each adjacent center frequency. The plurality of comb bands may be approximately equally spaced. The optical communication node may be included in a user device, or a server.

In optical communications networks including fiber optic networks, a network device or transponder can generate various wavelengths of light that propagate along a fiber optic cable. The various light wavelengths can be used to transmit or receive data. In dense wavelength division multiplexing (DWDM), which is a physical optical layer protocol for exchanging data, multiple "channels" are used to transmit or receive data in parallel on a single fiber or on two fibers ("fiber pair"). Data from multiple users may be accommodated by assigning different users to different wavelengths sent over the fiber.

In conventional systems, each optical link is typically powered by at least one erbium-doped fiber amplifier (EDFA), which can provide amplification in the forward direction (i.e., in the direction of data flow). In its basic form, an EDFA includes a Erbium-doped fiber (typically of length 20 meters) a pump laser (e.g., 980 nm or 1480 nm) and a WDM component for combining the pump signal with the DWDM signal.

Optical networks also sometimes utilize a Raman amplifier to inject power into the optical link. It is readily understood that Raman amplifiers (i.e., distributed Raman amplifiers) use the transmission medium itself as the medium into which the backward Raman pump is injected to provide amplification of optical signals traversing the optical medium. Thus, in such configurations, a weak signal is injected into the fiber that propagates in the opposite direction from the pump source will experience optical gain in the fiber producing an amplified signal at the wavelength within the band of wavelengths different from the pump source wavelength.

In some configurations, multiple optical pumps may be injected into the fiber to cause multiple bands of wavelengths where amplification will occur. When the bandwidth of the multiple bands of gain is wide, the amplifier may be referred to as an ultra-wideband amplifier. For example, four optical pump sources may propagate through a fiber in a first direction causing four bands of wavelengths within which gain occurs. An input signal propagating in the opposite direction to the pump sources with wavelength within any of the four bands with gain will be amplified. The multiple optical pump sources may propagate through the fiber in the first direction at the same time. The optical pump sources may be chosen to cause the multiple bands of gain to overlap. For example, the bands of gain may overlap to cause a continuous band of gain.

In some embodiments, an optical comb source is used to provide improved control of the optical gain in the fiber amplifier over an ultra-wide band of wavelengths while providing a substantially flat gain profile over the desired range of wavelengths. A comb source is an optical source with multiple equally spaced spectral lines all produced by a single source. The frequency (and so the wavelength) of each spectral line is spaced a predetermined frequency (or wavelength) from two adjacent spectral lines, one higher in frequency (shorter in wavelength) and the other lower in frequency (longer in wavelength). Each spectral line may have a shape or amplitude as a function of frequency (or wavelength). Each optical source or each spectral line of the comb source may serve to pump the optical fiber to cause optical gain in the fiber at a different frequency. The spectral shape of the gain and bandwidth may have a different shape from the shape of any of the pumping sources. In some example embodiments, the optical gain may be referred to as Raman gain. The multiple spectral lines of a comb source may cause the optical gain of the fiber amplifier to have an ultra-wide bandwidth. An optical signal with a frequency (or wavelength) within the ultra-wide bandwidth of the fiber amplifier will be amplified.

Advantages of using an optical comb source include improved control of the optical gain in the fiber amplifier over the ultra-wide band. For example, an optical comb source with equal amplitude or nearly equal amplitude spectral lines may result in little or no gain variation across the ultra-wide band. In another example, an optical comb source may produce spectral lines that are not evenly spaced and/or do not have nearly equal amplitudes. Another advantage of using an optical comb source over using multiple individual pump sources is the cost saving effected by reducing the number of components (e.g., number of individual sources, the associated electronic and electrical components, as well as connectors, couplers and the like). Moreover, a more efficient and flexible configuration can be implemented using a comb source without concerns regarding the real estate, connectivity and physical components that would be needed to add (or remove) one or more comb frequencies while maintaining a sufficiently flat optical gain spectrum.

A single comb source may be used in a C-band (1530-1565 nm) optical amplifier and an L-band (1565-1625 nm) optical amplifier. Since an optical comb source produces many spectral lines (e.g., 100 or more), a single comb source may replace multiple lasers or other optical sources by selecting the proper wavelength range of the pump sources in comb source.

FIG. 1 depicts an example block diagram illustrating an environment 100 in which an ultra-wideband fiber amplifier consistent with this disclosure may operate. One or more data centers 102, 104, and 106 may be interconnected via a network 108 (e.g., the Internet, or other network). Users such as users 110A, 110B, and 110N, may access data stored at the data centers. The data center may respond to the request immediately, may redirect the request to a different data center, or may download the requested data from the different data center and respond to the request. As an example, suppose User 1 at 110A requests content from a social networking system or a video streaming service. A server that initially receives the request may direct the request to Data Center 1 102 because that data center is geographically located closest to User 1 at 110A. By directing user requests to data centers that are geographically located closest to them, the number of network hops can be reduced and further responses can be rapidly communicated to the users. If the requested content is not available at Data Center 1 at 102, request can be forwarded to a different data center that stores the content, e.g., Data Center 2 at 104. However, because of the additional network hops between User 1 at 110A and Data Center 2 at 104 (as compared to Data Center 1 at 102), the content may arrive slowly. The user may notice sluggish performance, stops in video, etc. To reduce these issues, Data Center 1 at 102 may employ high speed communications lines 120 and 122 to quickly download the requested content from Data Center 2 at 104 and then respond to the user request. The high speed communications lines 120 and 122 can be fiber optic communications lines or any communications lines that offer very high bandwidth and throughput.

Figure 2:
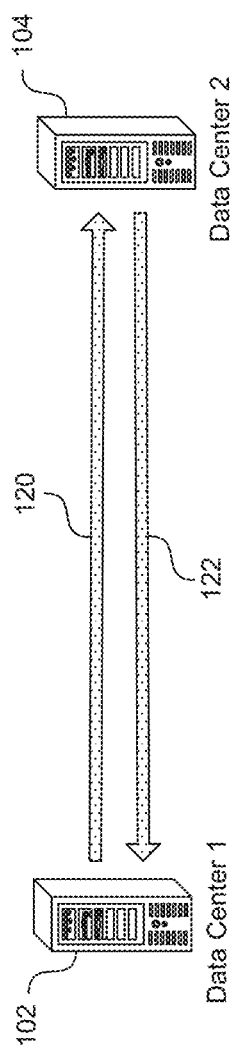
FIG. 2 is an example block diagram illustrating aspects of high speed communications lines, in accordance with some example embodiments.

FIG. 2 is a block diagram illustrating aspects of high speed communications lines, consistent with various embodiments. The description of FIG. 2 also refers to FIG. 1. According to FIG. 2, Data Center 1 at 102 is communicably coupled, via high speed communications lines 120 and 122 that together form a circuit, to Data Center 2 at 104. In some embodiments, the high speed communication lines 120 and 122 may together be a fiber optic communications pair. While in the example block diagrams of FIGS. 1 and 2 high speed communication lines 120 and 122 are shown as connecting the depicted data centers, it is understood that high speed lines can provide connectivity among different devices, such as between data centers and users, or among users. One or more of communications 120 and 122 may include the an ultra-wideband fiber amplifier consistent with this disclosure.

Figure 3A:
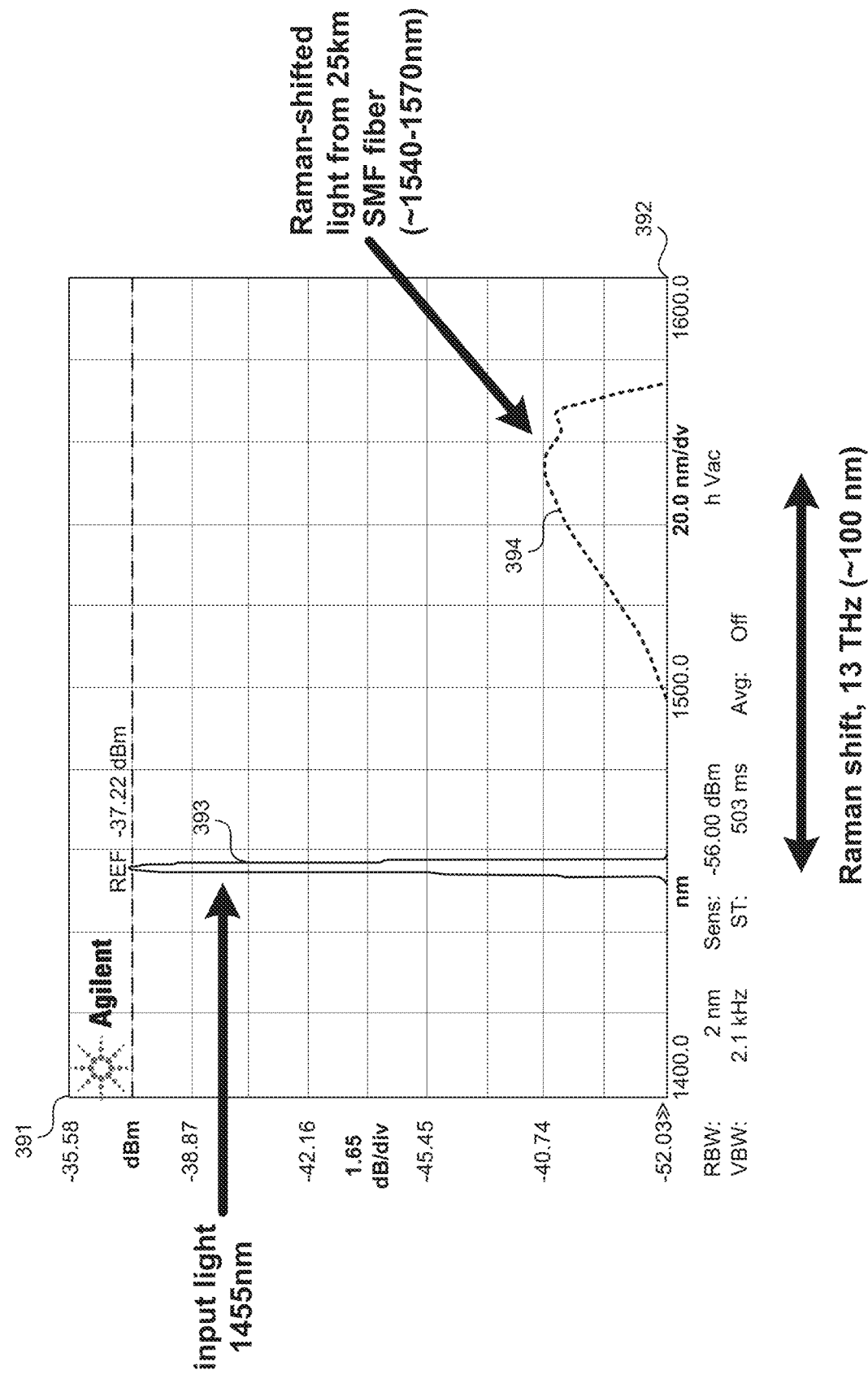
FIG. 3A is an example plot of frequency/wavelength shift in an optical fiber, in accordance with some example embodiments.

As explained earlier, a Raman amplifier may be implemented by injecting optical power backwards into fiber channel in the reverse direction of optical communication data flow. FIG. 3A is an example plot of frequency/wavelength shift (also known as the Raman effect) in an optical fiber FIG. 3A is a plot 391 of amplitude (in dBm) versus wavelength. The plot 391 corresponds to an optical pump source at 1455 nm (nanometers) that is input into a silica optical fiber of length 25 km (kilometers). The input optical pulse 393 is shown in FIG. 3A around the center wavelength of 1455 nm. After 25 km, the pumped fiber exhibits a gain between approximately 1540 nm and 1570 nm. This corresponds to a frequency shift of approximately 13 THz (terahertz). The shape of gain curve 394 is an example, other shapes are possible. Other fiber materials other than silica or other pump wavelengths may produce different gain shapes and/or wavelength/frequency shifts.

Figure 3B:
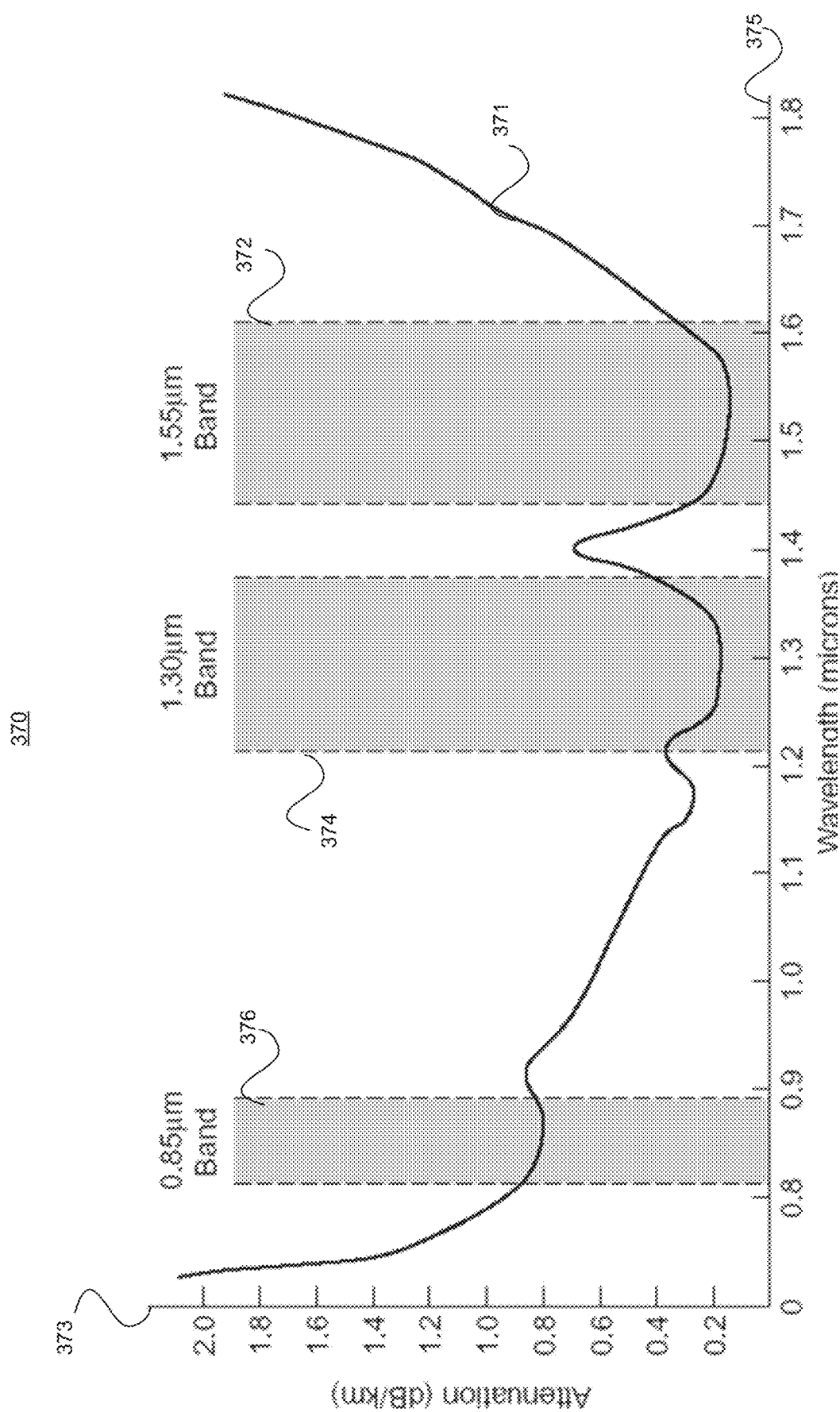
FIG. 3B is an example plot of attenuation for silica fiber, in accordance with some example embodiments.

In producing a substantially flat spectral gain characteristic in accordance with the disclosed embodiments, wavelength dependent loss of the fiber medium may be taken into consideration. FIG. 3B is an example plot 370 of attenuation for silica fiber, in accordance with some example embodiments. The description of FIG. 3B also refers to FIGS. 1, 2, and 3A. FIG. 3B at 371 depicts a plot of loss per kilometer of a silica fiber (dB/km) 373 verses wavelength in microns 375. The plot 371 of FIG. 3B includes an example band of wavelengths corresponding to a particular laser centered at a wavelength of 1.55 microns 372, an example band of wavelengths for a laser centered at a wavelength of 1.30 microns 374, and a band of wavelengths for a laser centered at a wavelength of 0.85 microns 376. The selection of fiber optic cable material in conjunction with adjustment of the gain of the optical source at individual wavelengths (or group of wavelengths) enables the system designer to achieve the desired gain profile. Other materials may be used for optical fiber 330 that have different attenuations as a function of wavelength than shown in FIG. 3B. Wavelength dependent fiber losses are typically handled at the network level by gain equalizers or gain flattening filters.

Figure 3C:
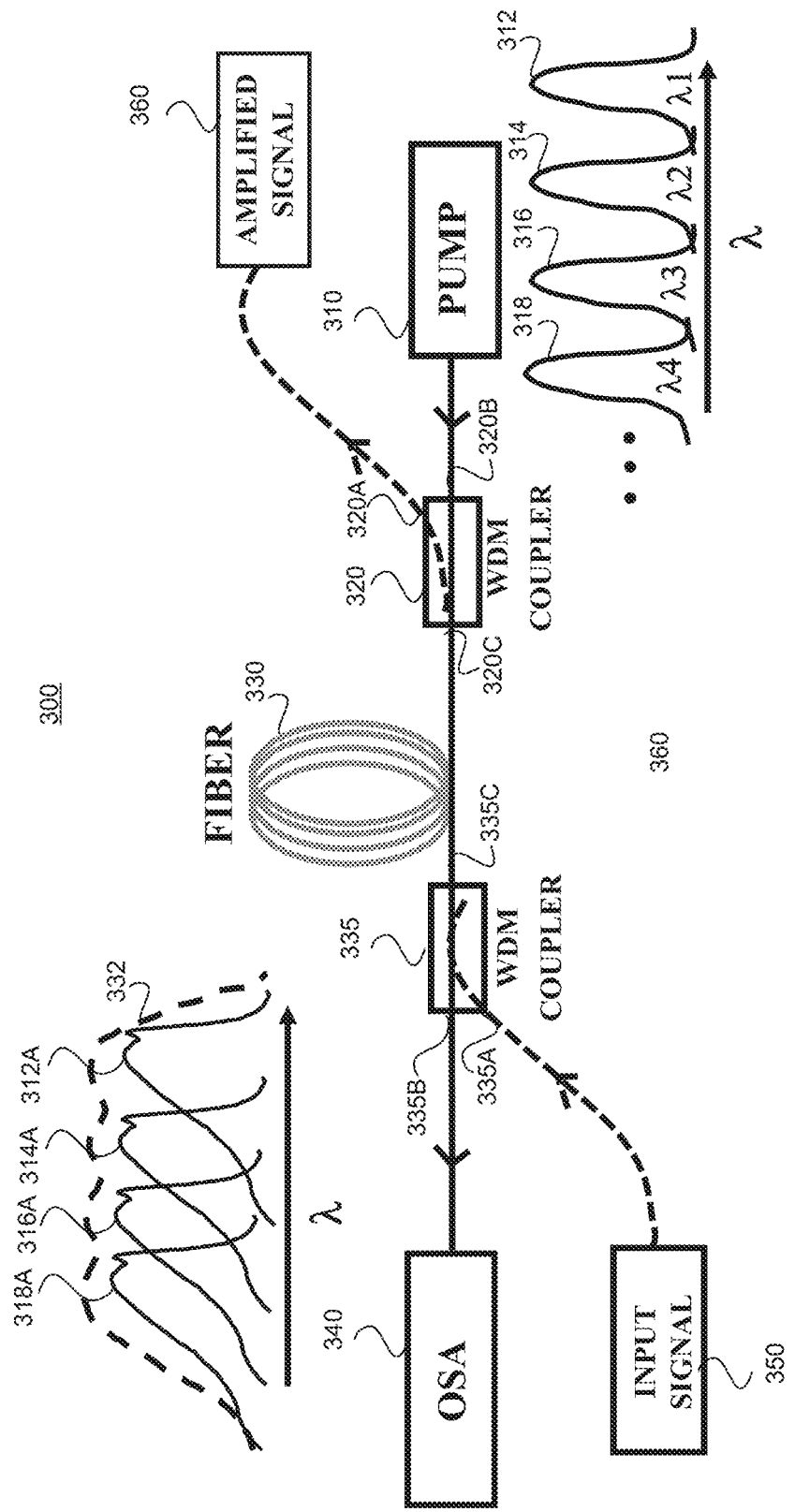
FIG. 3C is an example block diagram illustrating an optical amplifier including multiple pump sources.
Figure 3D:
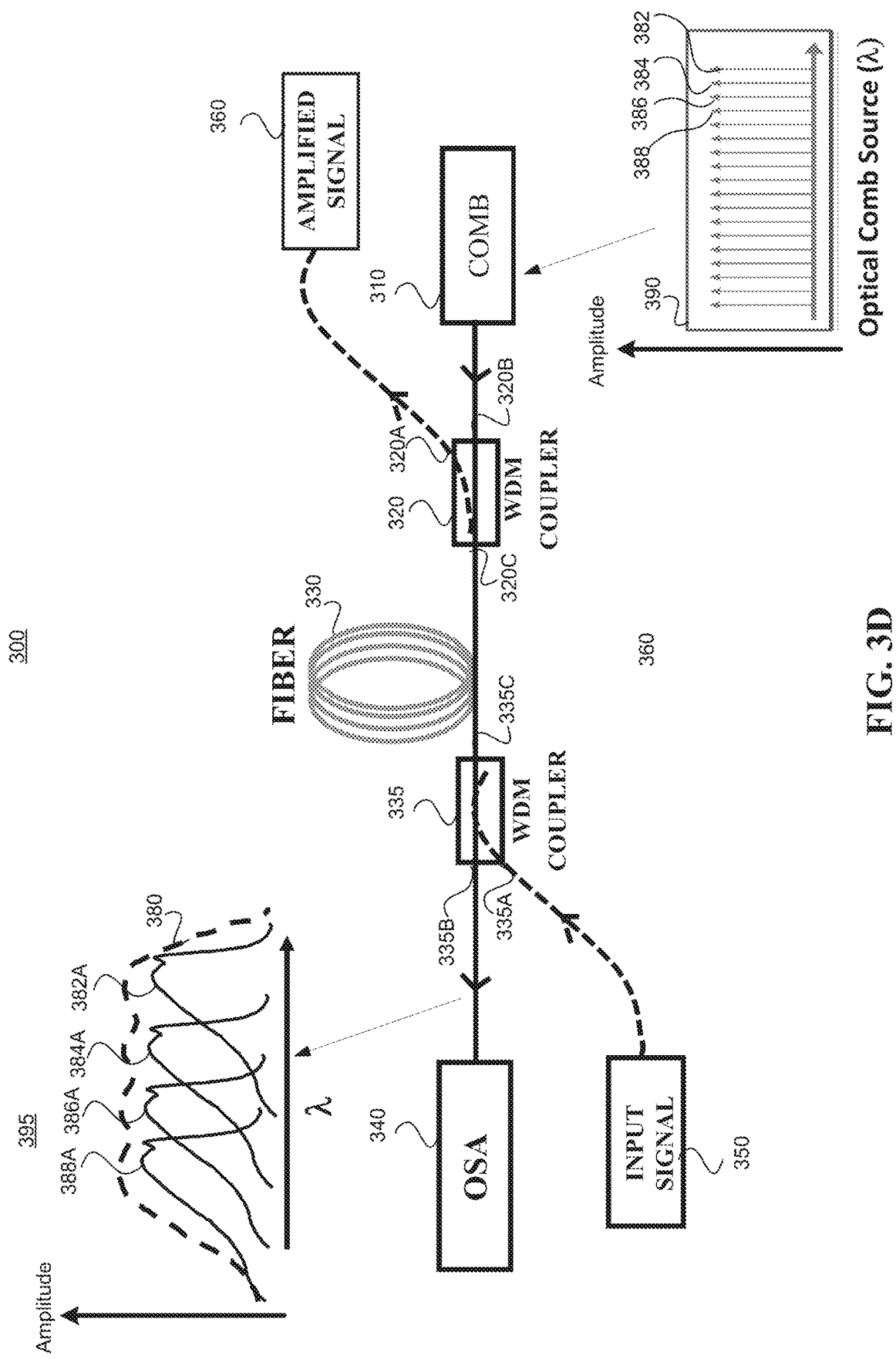
FIG. 3D is an example block diagram illustrating an optical amplifier including an optical comb source, in accordance with some example embodiments.

FIG. 3C is an example block diagram illustrating an ultra-wideband fiber amplifier that uses discrete sources to provide optical pumping over wideband. The description of FIG. 3C also refers to FIGS. 1, 2, 3A, and 3B. FIG. 3C depicts optical pump source 310 coupled to a first port 320A of wavelength division multiplexing (WDM) coupler 320. Port 320C of WDM coupler 320 is coupled to a first side of optical fiber 330. It should be noted that while FIG. 3D illustrates an example implementation that uses a WDM Coupler 335, in some embodiments, a tap coupler (e.g., a power splitter) can be utilized. Coupled to the second side of optical fiber 330 is port 335C of WDM coupler 335. Port 335B of WDM coupler 335 is coupled to OSA 340 and port 335A of WDM coupler 335 is coupled to input signal 350. It should be noted that OSA 340 is provided in this example set up of FIG. 3C (and in FIG. 3D—described later) to verify the amplification of the optical systems, and is not needed for implementation of the system. Input signal 350 propagates in fiber 330 in an opposite direction from the propagation from optical pump source 310. Input signal 350 is amplified by fiber 330 and is provided from port 320A of WDM coupler 320 as amplified signal 360.

Wavelength division multiplexing (WDM) coupler 320 may be coupled to optical pump source 310. WDM coupler 320 may be used to multiplex/demiltiplex multiple wavelengths onto/from an optical fiber. WDM coupler 320 multiplexes optical pump source 310 onto optical fiber 330 and demultiplexes amplified signal 360 from optical fiber 330.

Optical pump source 310 may include one or more optical sources such as lasers. Each optical source may generate optical power across a different band of wavelengths (or frequencies). In the example of FIG. 3C, four optical pump sources produce optical power across four bands, where each band has a wavelength in the band corresponding to a peak power amplitude. For example, wavelength band 312 corresponds to a first optical source with a power peak at $\lambda_1$, wavelength band 314 corresponds to a second optical source with a power peak at $\lambda_2$ wavelength band 316 corresponds to a third optical source with a power peak at $\lambda_3$, and wavelength band 318 corresponds to a fourth optical source with a power peak at $\lambda_4$. Each optical source may include a laser diode, solid state laser, or other type of laser, or optical source. Optical pump source 310 may include fewer than four optical sources (e.g., one, two, or three) or more than four optical sources. The spectral shapes of the curves at 312, 314, 316, and 318 are examples. Other spectral shapes are possible. The spectral shapes of different optical pump sources such as 312, 314, 316, and 318 may have the same or different spectral shapes.

Optical fiber 330 may be coupled to WDM coupler 320 at one end of the fiber 330 and WDM coupler 335 at the other end of the fiber 330. In some embodiments, the comb source has a flatness of approximately 1 dB. Optical fiber 330 may include silica or other material providing low-loss at the optical source wavelengths and the bands of optical gain. The wavelengths of the optical sources may be chosen based on the loss of a selected optical fiber as a function of wavelength and/or the optical fiber material may be chosen based on one or more selected optical sources.

Optical pump source 310 may cause optical fiber 330 to exhibit gain at wavelengths different from the wavelengths produced by the one or more optical sources such as 312, 314, 316, and 318. For example, the gain in fiber 330 as a function of wavelength due to the optical source 312 may correspond to 312A. For example, a pump source centered at 1455 nm may produce a gain band between 1540 nm and 1570 nm (see, for example FIG. 3A). Other pump sources produce different gain bands. The shape of the plot of amplitude as a function of wavelength at 312 may be a Gaussian shape or any other shape. The shape of the corresponding gain as a function of wavelength may be a Raleigh shape, Gaussian shape or other shape. The gain as a function of wavelength may have the same shape or a different shape from the optical source amplitude as a function of wavelength. The optical source producing 314 may produce the gain at 314A, the optical source producing 316 may produce the gain at 316A, the optical source producing 318 may produce the gain at 318A. The combined gain due to overlapping gain plots may provide gain over an ultra-wideband range of wavelengths. Overlapping gain plots may produce a combined gain plot that is substantially flat over the ultra-wide band with some ripple. Combined gain plot 332 shows an example of a flat gain plot with some ripple. Other combined gain curves may also be generated based on the selection of optical sources and fiber material. The configuration of FIG. 3C, however, requires individual sources, individual control circuitry and the associated physical components that can increase the cost and maintenance requirements of such a system.

FIG. 3D depicts an example of an optical pump source 310 for use in an optical communication system in accordance with an embodiment. The description of FIG. 3D also refers to FIGS. 1, 2, 3A, 3B, and 3C. The spectral characteristics of the optical comb source 310 before passing through fiber 330 at 390 and after passing through fiber 330 at 395. Overlapping gain plots are illustrated at 380. An optical comb source may produce multiple equally spaced, or nearly equally spaced wavelengths. For example, each wavelength may be spaced 5 nm (or as much as 90-100 nm) from adjacent wavelengths on each side. For example, comb finger 384 may be centered 5 nm shorter in wavelength than comb finger 382 and 5 nm longer in wavelength from comb finger 386. Each comb finger such as 382, 384, 386 may have an associated shape of amplitude as a function of wavelength (FIG. 3D shows comb fingers as delta functions but in a practical implementation, each comb finger will span a range of wavelengths where each "finger" may have a shape such as a Gaussian shape or other shape). Comb source 390 may produce comb fingers with peak amplitudes that are the same for each comb finger or different amplitudes such as following an envelope (e.g., a sinusoidal envelope or other envelope shape). Comb source 390 may produce 10 comb fingers, 100 comb fingers, or any other number of comb fingers. The amplitudes of the comb fingers may be adjusted to cause a predetermined gain profile at 335C as a function of wavelength. For example, the comb fingers may be adjusted to cause a flat gain profile across the wavelength band.

By passing comb source 390 though optical fiber 330 multiple gain bands as a function of wavelength may be produced. In some example embodiments, each comb finger may produce a corresponding gain band. The gain bands corresponding to the combined comb fingers may produce gain over an ultra-wide band of wavelengths. The combined gain may be flat or nearly flat as a function of wavelength or may follow an envelope shape. For example, comb fingers 382, 384, 386, and 388 may produce gains as a function of wavelength depicted at 382A, 384A, 386A, and 388A. The remaining comb fingers at 390 may also produce gain at wavelengths shorter that 388A (only gain plots for 382, 384, 386, 388 are shown at 380 but additional gain plots are present). Optical comb source 390 may include one or more optical sources and may also include one or more optical components such as a modulator or other optical device and/or one or more radio frequency components.

Figure 4:
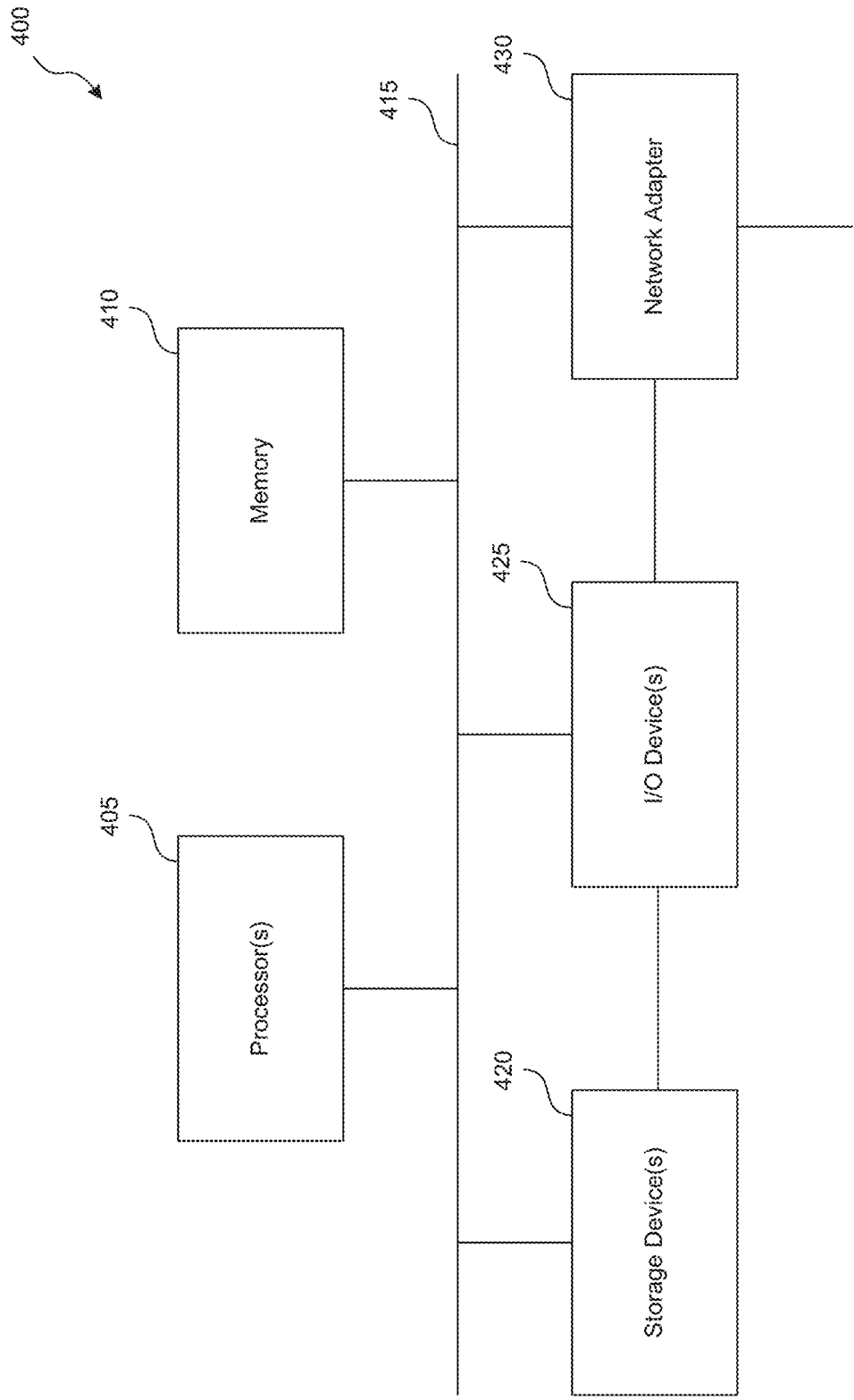
FIG. 4 is an example block diagram of a computing device, in accordance with some example embodiments.

Operations and management of the disclosed components, including the pumps and amplifiers can be implemented under the control of one or more computing devices. The description of FIG. 4 also refers to FIGS. 1, 2, 3A, 3B, 3C, and 3D. FIG. 4 is a block diagram of a such computing system, consistent with various embodiments. The computing system 400 may include one or more central processing units ("processors") 405, memory 410, input/output devices 425 (e.g., keyboard and pointing devices, display devices), storage devices 420 (e.g., disk drives), and network adapters 430 (e.g., network interfaces) that are connected to an interconnect 415. The interconnect 415 is illustrated as an abstraction that represents any one or more separate physical buses, point to point connections, or both connected by appropriate bridges, adapters, or controllers. The interconnect 415, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 410 and storage devices 420 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 410 can be implemented as software and/or firmware to program the processor(s) 405 to carry out actions described above. In some embodiments, such software or firmware may be initially provided to the processing system 400 by downloading it from a remote system through the computing system 400 (e.g., via network adapter 430).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A system, comprising:
   a first wavelength division multiplexing coupler including a first port, a second port and a third port, wherein a first end of an optical fiber is coupled to the third port of the first wavelength division multiplexing coupler; and
   an optical pumping source coupled to the first port, wherein:
      the first port receives an optical pumping signal from the pumping source in a first set of bands of wavelengths propagating in a reverse direction along the optical fiber,
      the second port provides an amplified signal within a second set of bands of wavelengths propagating in a forward direction along the optical fiber, wherein the second set of bands propagating in the forward direction is different from the first set of bands propagating in the reverse direction, and
      the pumping source comprises a comb source, the comb source as a single source producing a plurality of comb bands within the first set of bands of wavelengths, the plurality of comb bands being approximately equally spaced in wavelength and producing a plurality of gain bands within the second set of bands of wavelengths upon propagation through the optical fiber, the optical pumping signal causing an optical amplification of an input data signal in the optical fiber across the second set of bands of wavelengths to produce the amplified signal from the input data signal; and
   a second wavelength division multiplexing coupler including a fourth port, a fifth port, and a sixth port, wherein a second end of the optical fiber is coupled to the fourth port, a source of the input data signal is directly coupled to the fifth port, one or more amplitudes of the plurality of comb bands within the first set of bands of wavelengths have been adjusted to cause a predetermined gain profile at the second end of the optical fiber coupled to the fourth port, and the sixth port is configured to be coupled to an optical spectrum analyzer (OSA) for amplification verification of a detected gain profile of the plurality of comb bands traveling in the reverse direction opposite the forward direction of the input data signal.

2. The system of claim 1, wherein the optical fiber has a length greater than 25 kilometers.

3. The system of claim 1, wherein the optical fiber has a length less than or equal to 25 kilometers.

4. The system of claim 1, wherein the pumping source providing optical power to the optical fiber forms a Raman amplifier.

5. The system of claim 1, wherein the plurality of gain bands overlap and produce the predetermined gain profile across the second set of bands of wavelengths.

6. The system of claim 1, wherein at least one band of the first set of bands of wavelengths lies between 1428 nm and 1466 nm.

7. The system of claim 1, wherein at least one band of the second set of bands of wavelengths lies between 1535 nm and 1565 nm.

8. The system of claim 7, wherein the each of the plurality of comb bands within the second set of bands of wavelengths are approximately equally spaced from one another.

9. The system of claim 1, wherein each of the plurality of comb bands within the first set of bands of wavelengths is separated from another comb band by 90 to 100 nm.

10. The system of claim 1, wherein the system is included in:
   a user device, or
   a server.

11. A method of optical communication, comprising:
   providing, at a first wavelength division multiplexing coupler, an optical pumping signal from a pumping source in a first set of bands of wavelengths propagating in an optical fiber in a reverse direction, wherein a second port of the first wavelength division multiplexing coupler provides an amplified signal within a second set of bands of wavelengths propagating in a forward direction, wherein the second set of bands propagating in the forward direction is different from the first set of bands propagating in the reverse direction, wherein the pumping source comprises a comb source, the comb source as a single source producing a plurality of comb bands within the first set of bands of wavelengths, wherein the plurality of comb bands are approximately equally spaced in wavelength, and the plurality of comb bands produces a plurality of gain bands within the second set of bands of wavelengths; and
   obtaining the amplified signal of an input data signal, wherein the optical pumping signal causes amplification in the optical fiber of optical signals across the second set of bands of wavelengths, wherein a second end of the optical fiber is coupled to a fourth port of a second wavelength division multiplexing coupler, a source of the input data signal is directly coupled to a fifth port of the second wavelength division multiplexing coupler, one or more amplitudes of the plurality of comb bands within the first set of bands of wavelengths have been adjusted to cause a predetermined gain profile at the second end of the optical fiber coupled to the fourth port, and a sixth port of the second wavelength division multiplexing coupler is configured to be coupled to an optical spectrum analyzer (OSA) for amplification verification of a detected gain profile of the plurality of comb bands traveling in the reverse direction opposite the forward direction of the input data signal.

12. The method of optical communication of claim 11, wherein the optical fiber has a length greater than 25 kilometers.

13. The method of optical communication of claim 11, wherein the optical fiber has a length less than or equal to 25 kilometers.

14. The method of optical communication of claim 11, wherein the optical pumping signal causes amplification of the signals that propagate through the optical fiber based on a Raman effect.

15. The method of optical communication of claim 11, wherein the plurality of gain bands overlap and produce the predetermined gain profile across the second set of bands of wavelengths.

16. The method of optical communication of claim 11, wherein at least one band of the first set of bands of wavelengths lies between 1428 nm and 1466 nm.

17. The method of optical communication of claim 11, wherein the plurality of comb bands within the first set of bands of wavelengths are approximately equally spaced by at least 5 nm.

18. The method of optical communication of claim 17, wherein each of the plurality of comb bands within the first set of bands of wavelengths is separated from another comb band by 90-100 nm.

19. The method of optical communication of claim 11, wherein at least one band of the second set of bands of wavelengths lies between 1353 nm and 1466 nm.

20. The method of optical communication of claim 11, wherein the first wavelength division multiplexing coupler is included in:
a user device, or
a server.

* * * * *